(12) United States Patent
Guo et al.

(10) Patent No.: US 11,682,194 B2
(45) Date of Patent: Jun. 20, 2023

(54) TRAINING METHOD FOR ROBUST NEURAL NETWORK BASED ON FEATURE MATCHING

(71) Applicant: National University of Defense Technology, Hunan (CN)

(72) Inventors: Yanming Guo, Hunan (CN); Jian Li, Hunan (CN); Songyang Lao, Hunan (CN); Liang Bai, Hunan (CN); Yingmei Wei, Hunan (CN); Yulun Wu, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/950,805

(22) Filed: Sep. 22, 2022

(65) Prior Publication Data

US 2023/0089335 A1 Mar. 23, 2023

(30) Foreign Application Priority Data

Sep. 23, 2021 (CN) .......................... 202111117016.7

(51) Int. Cl.
*G06V 10/774* (2022.01)
*G06V 10/82* (2022.01)
(Continued)

(52) U.S. Cl.
CPC ............ *G06V 10/774* (2022.01); *G06F 16/55* (2019.01); *G06F 16/56* (2019.01);
(Continued)

(58) Field of Classification Search
CPC ...... G06V 10/774; G06V 20/70; G06V 10/82; G06V 10/751; G06V 10/95; G06V 10/764; G06F 16/55; G06F 16/5866; G06F 16/56
See application file for complete search history.

(56) References Cited

U.S. PATENT DOCUMENTS 10,902,337 B1 * 1/2021 Tang ..................... G06F 18/214
11,321,937 B1 * 5/2022 Jiang .................... G06V 20/647
(Continued)

OTHER PUBLICATIONS

Dewi et al. "Evaluation of Robust Spatial Pyramid Pooling Based on Convolutional Neural Network for Traffic Sign Recognition System " Electronics Special Issue Deep Learning Based Object Detection May 25, 2020, pp. 1-21.*
Huang et al. "Robust Image Matching by Dynamic Feature Selection" Aug. 13, 2020 Computer Vision and Pattern Recognition pp. 1-14.*

*Primary Examiner* — Mia M Thomas (57) ABSTRACT

A training method for a robust neural network based on feature matching is provided in this disclosure, which includes following steps. Step A, a first stage model is initialized. The first stage model includes a backbone network, a feature matching module and a fullple loss function. Step B, the first stage model is trained by using original training data to obtain a second stage model. Step C, the second stage model is attacked so as to generate PGD adversarial samples of the original training data, and the second stage model is trained again with the generated adversarial samples and the original training data. Step D, training parameters are adjusted and the second stage model is trained again, and parameters for which the model has highest accuracy on an original test set are saved.

5 Claims, 6 Drawing Sheets

(51) Int. Cl.
  *G06V 10/94* (2022.01)
  *G06V 20/70* (2022.01)
  *G06F 16/55* (2019.01)
  *G06V 10/764* (2022.01)
  *G06F 16/58* (2019.01)
  *G06F 16/56* (2019.01)
  *G06V 10/75* (2022.01)

(52) U.S. Cl.
  CPC ........ *G06F 16/5866* (2019.01); *G06V 10/751* (2022.01); *G06V 10/764* (2022.01); *G06V 10/82* (2022.01); *G06V 10/95* (2022.01); *G06V 20/70* (2022.01)

(56) References Cited

U.S. PATENT DOCUMENTS

| | | | |
|---|---|---|---|
| 11,429,809 B2* | 8/2022 | Ge | G06V 10/82 |
| 2019/0042945 A1* | 2/2019 | Majumdar | G06N 3/084 |
| 2019/0171935 A1* | 6/2019 | Agrawal | G06N 3/04 |
| 2020/0218982 A1* | 7/2020 | Annau | G06N 20/00 |
| 2021/0089807 A1* | 3/2021 | Liu | G06V 10/776 |
| 2021/0089824 A1* | 3/2021 | Ge | G06F 18/22 |
| 2022/0157081 A1* | 5/2022 | Pan | G06V 10/82 |
| 2022/0230305 A1* | 7/2022 | Picon | G06T 7/0012 |

* cited by examiner

TRAINING METHOD FOR ROBUST NEURAL NETWORK BASED ON FEATURE MATCHING

CROSS-REFERENCE TO RELATED APPLICATION

This application claims priority from the Chinese patent application 202111117016.7 filed Sep. 23, 2021, the content of which are incorporated herein in the entirety by reference.

TECHNICAL FIELD

The disclosure relates to the technical field of image classification, in particular to a training method for a robust neural network based on feature matching.

BACKGROUND

Image classification systems are vulnerable to adversarial attacks, which are imperceptible to human and can easily fool deep neural networks. Recent researches have shown that model's robustness against the adversarial attacks can be greatly improved by regularizing the networks by introducing randomness, but complex calculations and numerous additional parameters are generally involved in a randomness module, which seriously affects model performance on clean data. For dealing with the adversarial attacks, adversarial training is considered as a simplest and uninterrupted way to improve the robustness of the model; and regularizing the network by introducing randomness is another effective way to deal with the adversarial attacks. Although these methods add noise in different ways, their ultimate goals are to allow outputs of network layers to vary within an acceptable range. Introduction of a large amount of randomness results in phenomenon of over-regularization (i.e., under-fitting), and these methods generally involve complex training processes, in which multiple noise hyper-parameters need to be manually set, which greatly affects final performance and have to be adapted carefully.

SUMMARY

On A technical problem to be solved by the present disclosure is to provide a training method for a robust neural network based on feature matching, which can overcome shortcomings of the related art, significantly improve robustness of a neural network against adversarial attacks, but does not increase trainable parameters of the network.

The disclosure comprises following steps A to D.

Step A, a first stage model is initialized. The first stage model includes a backbone network, a feature matching module and a fullple loss function.

Step B, the first stage model is trained by using original training data to obtain a second stage model.

Step C, the second stage model is attacked so as to generate PGD adversarial samples of the original training data, and the second stage model is trained again with the generated adversarial samples and the original training data.

Step D, training parameters are adjusted and the second stage model is trained again, and parameters for which the model has highest accuracy on an original test set are saved.

Preferably, a last convolution layer of a backbone network and a global average pool are used to extract a feature $F_x$ of an input image X.

Preferably, the feature matching module includes three processes: embedding of a tag, querying of positive features and negative features, and calculation of a distance between features.

Preferably, the fullple loss function is expressed as $$\mathcal{L}(x, f_w) = \max\{d(F_x, F_P) - \alpha, 0\} + \max\{\beta - d(F_x, F_N), 0\},$$

Label coding features are classified into positive features FP and negative features FN, which are obtained through a query process. For a given image x and its label y, FP indicates an one-dimensional vector at a y-th row in an embedding matrix, and FN indicates remaining vectors. The fullple loss function is divided into two parts. A first part refers to positive sample loss. If an Euclidean distance between the image feature Fx and the positive feature FP is less than a threshold $\alpha$, loss of this part is zero, in which $\alpha$ is set to allow an output of the model to vary in a specified range in training. A second part refers to negative sample loss, which is configured to prevent the model from learning similar features of different categories of images. If a distance between the image feature Fx and all of the negative features FN exceeds a threshold $\beta$, loss of this part is zero.

Preferably, $$\alpha = \sqrt{\text{len}(F_x) \cdot 2 \cdot 10^{-9}}$$

$$\beta = \sqrt{\text{len}(F_x) \cdot 7 \cdot 10^{-4}},$$

len(Fx) indicates a length of an image feature extracted by the backbone neural network.

Preferably, Euclidean distances between feature vectors $F_i\{i=0, 1, , n-1\}$ of respective categories and the feature vector Fx of the image are calculated to form matching scores of the network, which represents difference between feature vector of the image and feature vectors of n categories, $$f_w(x) = [d(F_x, F_0), d(F_x, F_n)].$$

An index with a smallest matching score is selected as a classification result $$\text{pred} = \arg\min\{f_w(x)\}.$$

Preferably, in step B, a learning rate in training lr=0.001, and a training cycle is 20 epochs.

Preferably, in step C, perturbation strength of the PGD adversarial samples is 8/255, and a number of attack steps is 7.

Preferably, in calculating the loss, losses of the adversarial samples and the original training data are weighted and averaged, with weights of the both being 0.5.

Preferably, in step D, firstly the step C is iterated for 95 epochs, and then the step C is iterated for 100 epochs after the learning rate lr is adjusted to be 0.0001.

The disclosure has advantages that the feature matching module is configured to replace a fully connected layer, which can substantially improve robustness of the model against adversarial attacks, but does not increase trainable parameters of the network. Compared with a network regularization method with noise injection, this method loses less accuracy of clean data and eliminates complicated training processes. A large number of experiments on CIFAR10 and SVHN data sets show that the disclosure presents most advanced robustness against adversarial attacks in white-box and black-box environments.

DETAILED DESCRIPTION

Figure 1:
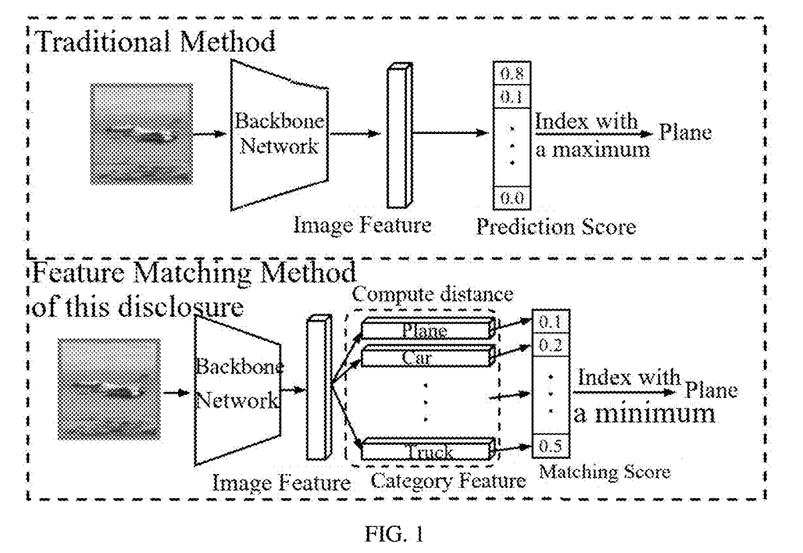
FIG. 1 is a comparison diagram between a method of the present disclosure and a conventional method.
Figure 2:
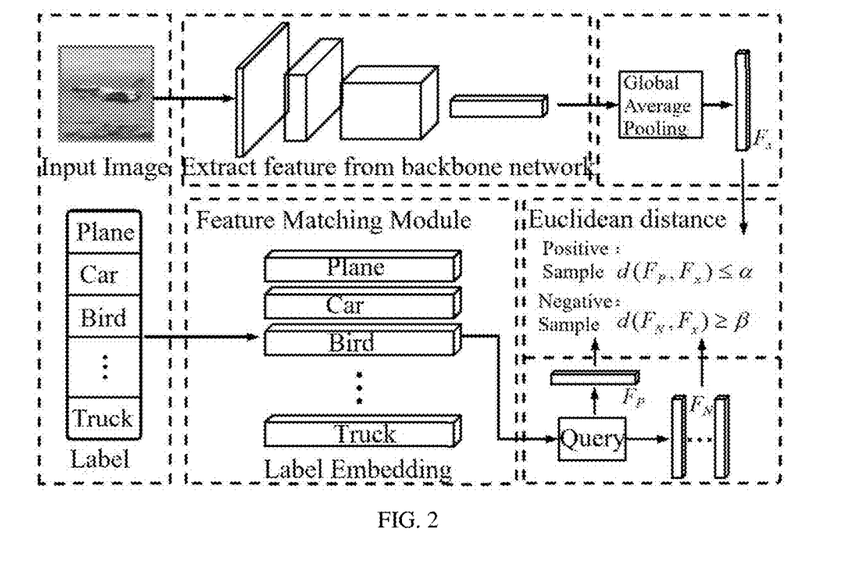
FIG. 2 shows a schematic diagram of a model according to the present disclosure.
Figure 3:
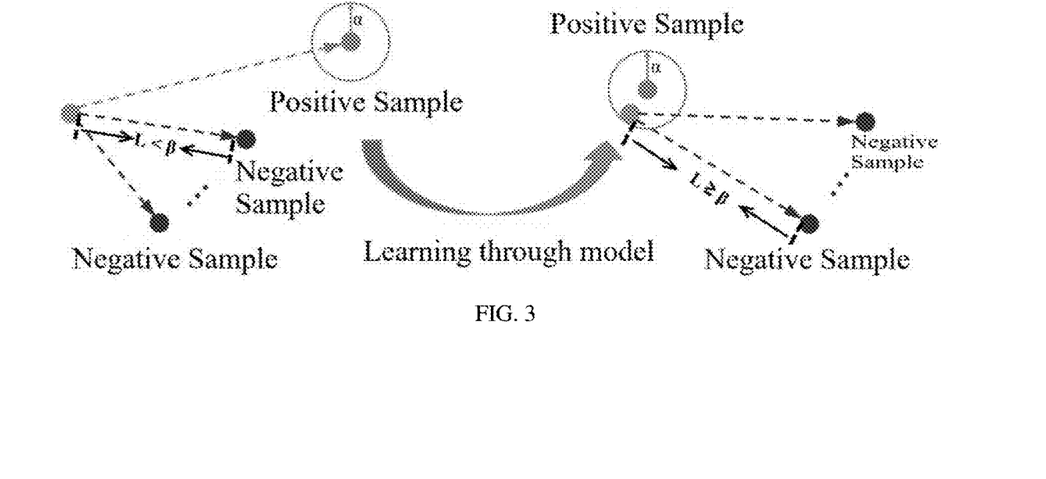
FIG. 3 shows a schematic diagram in which the fullple loss function encourages an image to be close to a true label embedding vector and far away from all of fake label embedding vectors.

Referring to FIGS. 1 to 3, a training method for a robust neural network based on feature matching includes following steps A to D.

Step A, a first stage model is initialized. The first stage model includes a backbone network, a feature matching module and a fullple loss function; and a last convolution layer of a backbone network and a global average pool are used to extract a feature Fx of an input image X. The feature matching module includes three processes: embedding of a tag, querying of positive features and negative features, and calculation of a distance between features. The fullple loss function is expressed as $$\mathcal{L}(x, fw) = \max\{d(F_x, F_P) - \alpha, 0\} + \max\{\beta - d(F_x, F_N), 0\},$$

Label coding features are classified into positive features FP and negative features FN, which are obtained through a query process. For a given image x and its label y, FP indicates an one-dimensional vector at a y-th row in an embedding matrix, and FN indicates remaining vectors. The fullple loss function is divided into two parts. A first part refers to positive sample loss. If an Euclidean distance between the image feature Fx and the positive feature FP is less than a threshold $\alpha$, loss of this part is zero, in which $\alpha$ is set to allow an output of the model to vary in a specified range in training. A second part refers to negative sample loss, which is configured to prevent the model from learning similar features of different categories of images. If a distance between the image feature Fx and all of the negative features FN exceeds a threshold $\beta$, loss of this part is zero.

$$\alpha = \sqrt{\operatorname{len}(F_x) \cdot 2 \cdot 10^{-9}}$$

$$\beta = \sqrt{\operatorname{len}(F_x) \cdot 7 \cdot 10^{-4}},$$

len(Fx) indicates a length of an image feature extracted by the backbone neural network.

Euclidean distances between feature vectors Fi{i=0, 1, , n−1} of respective categories and the feature vector Fx of the image are calculated to form matching scores of the network, which represents difference between feature vector of the image and feature vectors of n categories, $$fw(x) = [d(F_x, F_0), d(F_x, F_1), \ldots, d(F_x, F_n)].$$

An index with a smallest matching score is selected as a classification result $$\operatorname{pred} = \arg\min\{fw(x)\}.$$

Step B, the first stage model is trained by using original training data to obtain a second stage model; and a learning rate in training lr=0.001, and a training cycle is 20 epochs.

Step C, the second stage model is attacked so as to generate PGD adversarial samples of the original training data, and the second stage model is trained again with the generated adversarial samples and the original training data; and perturbation strength of the PGD adversarial samples is 8/255, and a number of attack steps is 7. In calculating the loss, losses of the adversarial samples and the original training data are weighted and averaged, with weights of the both being 0.5.

Step D, firstly the step C is iterated for 95 epochs, and then the step C is iterated for 100 epochs after the learning rate lr is adjusted to be 0.0001, and parameters for which the model has highest accuracy on an original test set are saved.

Experimental Verification

In order to evaluate defense performance of the present disclosure, the feature matching module is adopted to train various models and observe their robustness against different attack methods. In addition, the method of the present disclosure is compared with typical advanced methods, including common PGD adversarial training, Random Self-Ensemble (RSE), adversarial Bayesian Neural Network (Adv-BNN), Parametric Noise Injection (PNI), and learn2 Perturbation (L2P).

In the experiment, two commonly used data sets, CIFAR10 and SVHN, are used to evaluate defense capability of the model. The CIFAR10 data set involves 10 common types of natural images, consisting of 50,000 training data and 10,000 test data. Each of the images is provided with a RGB channel of 32×32 pixels. The SVHN data set comes from house numbers in Google street view and is a more challenging version of MNIST. It includes 99,289 RGB images with a size of 32×32, of which 73,257 images are used as training data and 26,032 images are used as test data. For these two data sets, a same data enhancement strategy of L2P (i.e. random cropping and random flipping) is used in a training process.

We use a VGG and ResNet architecture as a backbone network. A classic resource network architecture (ResNet-V1) and a new resource network architecture (ResNet-V2) are used in evaluating. Compared with ResNet-V1, ResNet-V2 has more stages and convolution kernels, so that it has more trainable parameters.

In order to evaluate the defense capability, the method of the present disclosure is compared with other defense methods in different white-box and black-box attack settings. White-box attacks include FGSM, PGD and CW, and while black-box attacks include OnePixel and metastatic attacks.

For attack algorithms, a same configuration as a competition algorithm is followed: for PGD attacks, attack strength $\varepsilon$ is set to be 8/255, a number of iteration steps K is set to be 7, with a step size $\alpha$ of 0.01. The FGSM attacks are with a same attack strength as the PGD attacks. C&W attacks adopt an Adam optimizer, with a learning rate of 5e-4. A weight c is initially set to be $10^{-3}$, and ranges from 0 to $10^{10}$. We use binary search nine times to determine the weight, which is iterated and optimized for 1000 times for each searching. A confidence parameter k of the C&W attack is set to be with five different values (0, 0.1, 1, 2, 5). For a one pixel attack, a number of perturbed pixels is set to be 1. For transferable attacks, the PGD algorithm is adopted to generate adversarial examples, which are then used to attack a target model.

In order to evaluate effectiveness of the proposed module, accuracy of the model with or without the FM module on clean data and perturbed data are compared. Experiments are conducted on two different data sets (CIFAR10, SVHN). As shown in Table 1, no additional parameter is introduced into the FM module. On the contrary, it contains slightly fewer parameters, because it eliminates a bias term of the fully connected layer. As expected, the attack algorithm may bring accuracy degradation to great extent, especially in undefended models. Taking the PGD attacks as an example, VGG19 and ResNet-V2(18) both exhibit accuracy of over 90% for clean data on both data sets, but with accuracy of less than 0.5% under the PGD attacks. In contrast, ResNet-V2(18) with the FM module can exhibit accuracy of over 80% for perturbed data on two data sets, and VGG19 with the FM module can also exhibit accuracy of over 65%. Similar to the PGD attacks, under the FGSM attacks, the model according to the present disclosure performs better than an undefended model. Generally speaking, the FM module of the present disclosure causes the backbone network to have strong robustness against adversarial attacks.

TABLE 1

| Model | Parameter | CIFAR10 | | | SVHN | | |
|---|---|---|---|---|---|---|---|
| | | Clean | FGSM | PGD | Clean | FGSM | PGD |
| ResNet-V2(18) | 11,173,962 | 95.47 | 41.82 | 0.25 ± 0.01 | 96.51 | 24.49 | 0.31 ± 0.01 |
| ResNet-V2(18) with FM | 11,173,952 | 91.66 | 81.63 | 80.03 ± 0.15 | 96.22 | 81.42 | 80.09 ± 0.17 |
| VGG19 | 20,040,522 | 93.77 | 26.38 | 0.05 ± 0.00 | 96.25 | 24.52 | 0.23 ± 0.01 |
| VGG19 with FM | 20,040,512 | 88.48 | 71.06 | 68.94 ± 0.16 | 94.15 | 66.61 | 66.00 ± 0.10 |

Accuracy of the FM module for the clean data may decreases to some extent, but this can be observed in all competitive methods (as shown in Table 2). Features of a data set include robust features and non-robust features. The undefended model can use all of the features in a training stage, so it can have good standard accuracy, but its robustness is poor. In order to improve the accuracy for perturbed data, the defense model tends to reject these non-robust features, which are only weakly correlated with labels. Therefore, when the defense model is applied to the clean data, the accuracy of the model may inevitably decline. However, it is acceptable for the FM model, because a small decrease in the accuracy for the clean data brings a large increase in the accuracy for the perturbed data. For example, on SVHN data set, ResNet-V2(18) with the FM model only reduces the accuracy for the clean data by 0.29% (from 96.51% to 96.22%) compared with the undefended model, but the accuracy for the perturbed data is significantly improved (from 0.31% to 80.09%) under the PGD attacks.

TABLE 2

| Model | #Clean | Adv-BNN | | | L2P | | |
|---|---|---|---|---|---|---|---|
| | | Clean | FGSM | PGD | Clean | FGSM | PGD |
| Net20 | 91.73 | 65.76 ± 5.92 | 51.85 ± 1.49 | 44.95 ± 1.21 | 83.62 ± 0.02 | 58.41 ± 0.07 | 51.13 ± 0.08 |
| Net32 | 92.63 | 62.95 ± 5.63 | 50.29 ± 2.70 | 54.62 ± 0.06 | 84.19 ± 0.06 | 59.94 ± 0.11 | 54.62 ± 0.06 |
| Net44 | 93.10 | 76.87 ± 0.24 | 58.55 ± 0.48 | 54.62 ± 0.06 | 85.61 ± 0.01 | 61.32 ± 0.13 | 54.62 ± 0.06 |
| Net56 | 93.39 | 77.20 ± 0.02 | 57.88 ± 0.02 | 54.62 ± 0.06 | 84.82 ± 0.04 | 61.53 ± 0.04 | 54.62 ± 0.06 |
| Net20 (1.5×) | 92.74 | 65.58 ± 0.42 | 36.11 ± 1.29 | 28.07 ± 1.11 | 85.40 ± 0.08 | 61.10 ± 0.06 | 53.32 ± 0.02 |
| Net20 (2×) | 93.43 | 79.03 ± 0.04 | 58.30 ± 0.14 | 53.46 ± 0.06 | 85.89 ± 0.10 | 61.61 ± 0.05 | 54.29 ± 0.02 |
| Net20 (4×) | 94.07 | 82.31 ± 0.03 | 59.01 ± 0.04 | 52.61 ± 0.12 | 86.09 ± 0.05 | 61.32 ± 0.02 | 55.75 ± 0.07 |
| Net18 | 95.47 | 82.15 ± 0.06 | 60.04 ± 0.01 | 53.62 ± 0.06 | 85.30 ± 0.09 | 62.43 ± 0.06 | 56.06 ± 0.08 |

TABLE 2-continued

| | FM without adv. train | | | FM with adv. train | | |
|---|---|---|---|---|---|---|
| Model | Clean | FGSM | PGD | Clean | FGSM | PGD |
| Net20 | 90.07 | 52.24 | 39.8 ± 0.25 | 89.75 | 66.68 | 53.12 ± 0.30 |
| Net32 | 91.52 | 58.82 | 50.18 ± 0.4 | 90.58 | 69.27 | 57.91 ± 0.20 |
| Net44 | 91.51 | 64.87 | 57.13 ± 0.21 | 90.52 | 71.26 | 60.26 ± 0.37 |
| Net56 | 91.38 | 61.67 | 60.09 ± 0.31 | 90.50 | 73.33 | 63.60 ± 0.25 |
| Net20 (1.5×) | 92.05 | 52.08 | 44.06 ± 0.32 | 91.09 | 68.54 | 56.32 ± 0.16 |
| Net20 (2×) | 92.63 | 55.01 | 49.43 ± 0.16 | 91.43 | 69.27 | 58.71 ± 0.17 |
| Net20 (4×) | 93.58 | 63.17 | 51.58 ± 0.22 | 91.87 | 73.72 | 64.73 ± 0.21 |
| Net18 | 93.24 | 78.02 | 77.62 ± 0.16 | 91.66 | 81.63 | 80.03 ± 0.15 |

Table 3 shows comparison results between a FM method of the present disclosure and other existing methods on a CIFAR10 data set. Compared with the undefended model, the robustness of the model against the PGD attacks is greatly improved in the existing method, but this robustness comes at the expense of the accuracy for the clean data. In contrast, the feature matching method of the present disclosure provides a robust model, and provides excellent performance on both the clean data and the perturbed data.

TABLE 3

| Method | Model | Clean | PGD |
|---|---|---|---|
| Vanilla | ResNet-V1(20)[4×] | 87 | 46.1 ± 0.1 |
| RSE | ResNet | 87.5 | 40 |
| DP | 28-10 Wide ResNet | 87 | 25 |
| PNI | ResNet-V1(20)[4×] | 87.7 ± 0.1 | 49.1 ± 0.3 |
| AdvBNN | ResNet-V1(56) | 77.20 | 54.62 ± 0.06 |
| L2P | ResNet-V2(18) | 85.3 ± 0.1 | 56.3 ± 0.1 |
| BPFC | ResNet-V2(18) | 82.4 | 50.1 |
| FM | ResNet-V2(18) | 91.66 | 80.03 ± 0.15 |

Figure 4:
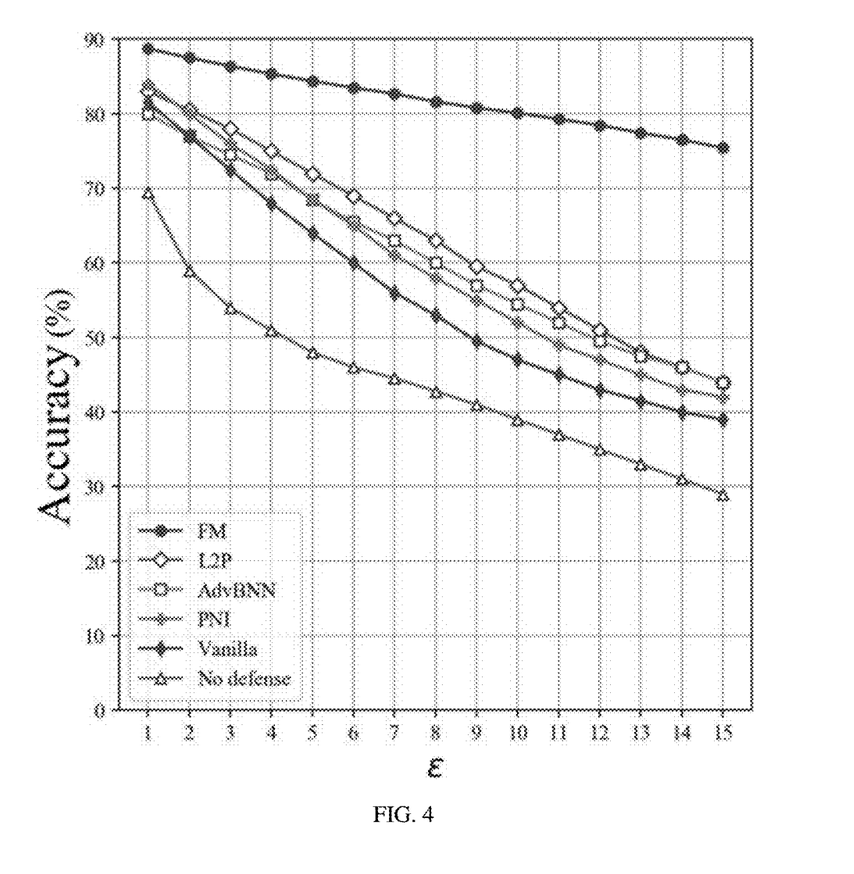
FIG. 4 is a comparison diagram between a method of the present disclosure (FM) and other methods under FGSM attacks with different strength.
Figure 5:
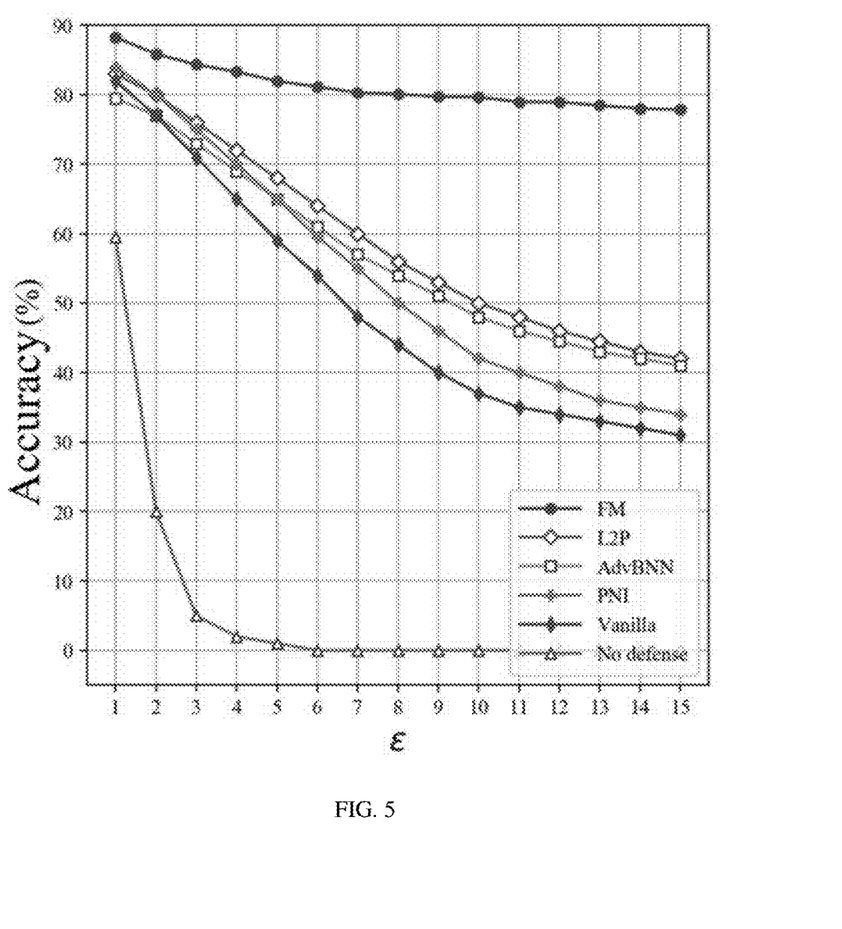
FIG. 5 is a comparison diagram between a method of the present disclosure (FM) and other methods under PGD attacks with different strength.

FIG. 4 illustrates robustness of the FM method of the present disclosure and an existing method under the FGSM attacks with different strength ε. All of the results are observed with ResNet-V2(18) as the backbone network. It can be seen that as more and more noise is added to the clean data, robustness of all of the networks can decrease. However, the FM method of the present disclosure can also achieve perfect performance, and with increase of the attack strength, a gap with other existing methods becomes more obvious. Specifically, compared with the most advanced L2P at present, the robustness in the present disclosure is almost doubled when the attack strength is ε=15. Next, the PGD attacks are adopted for the same experiment. As shown in FIG. 5, the accuracy of the undefended model drops rapidly to zero. Although the competitive methods improve the robustness of the model to different extent, there is still a significant gap between the competitive methods and the method of the present disclosure.

The above experiment and analysis are based on 1∞-norm white-box attacks. However, it is shown that a robust method for 1∞ norm is not necessarily effective for L2 norm. Therefore, in order to verify the feature matching method of the present disclosure, C&W algorithms with different confidences are adopted to attack RecNet-V2(18) with the feature matching module. k is set to have five different values, representing different attack strength. Table 4 shows defense performance of the method of this disclosure, in which an optimal result can be realized with the FM method for all of k values, and with increase of k, it can still maintain high robustness. Especially when k=5, the robustness is 46.2% (81.0 versus 34.8) higher than L2P.

TABLE 4

| Confident | Adv-BNN | PNI | L2P | FM |
|---|---|---|---|---|
| k = 0 | 78.9 | 66.9 | 83.6 | 83.9 |
| k = 0.1 | 78.1 | 66.1 | 84.0 | 84.2 |
| k = 1 | 65.1 | 34.0 | 76.4 | 81.5 |
| k = 2 | 49.1 | 16.0 | 66.5 | 81.5 |
| k = 5 | 16.0 | 0.08 | 34.8 | 81.0 |

Next, attack experiment are made in a black-box environment. Firstly, settings of L2P are followed and V1(20) and V2(18) are attacked with the one pixel attack. Results of the feature matching and competition methods are shown in Table 5. As shown in the table, the feature matching method provides highest robustness on both of the backbone networks. Next, the transferable attack is adopted to verify effectiveness of the feature matching method, and the PGD algorithm is adopted to generate adversarial examples. As shown in Table 6, the transferable attack involves two success rates, and proportions at left are proportions of images that can successfully attack the source model and the target model. A model A is an undefended ResNet-V2(18), while a model B is a ResNet-V2(18) trained with the method of the present disclosure. Proportions at right are proportions of images that cannot attack the source model but can attack the target model. Although the PGD algorithm exhibits a success rate of 99.74% in attacking the model A, but when these adversarial examples are used in the model B, the success rate is only 13.76%. Although the PGD algorithm exhibits a success rate of 19.73% in attacking the model B, but 64.72% of adversarial examples can successfully attack the model A. The results show that the feature matching method of the disclosure provides a robust prediction for this attack. The experiment described above demonstrated that the method of the disclosure also performs well in the black-box environment.

TABLE 5

| Backbone | AdvBNN | PNI | L2P | FM |
|---|---|---|---|---|
| ResNet-V1(20) | 58.40 | 67.40 | 70.15 | 74.90 |
| ResNet-V2(18) | 68.60 | 50.90 | 64.45 | 70.80 |

TABLE 6

| Source model | PGD attack | Transferability | attack |
|---|---|---|---|
| A | 99.74% | 13.76% | 0% |
| B | 19.73% | 64.72% | 1.64% |

Figure 6:
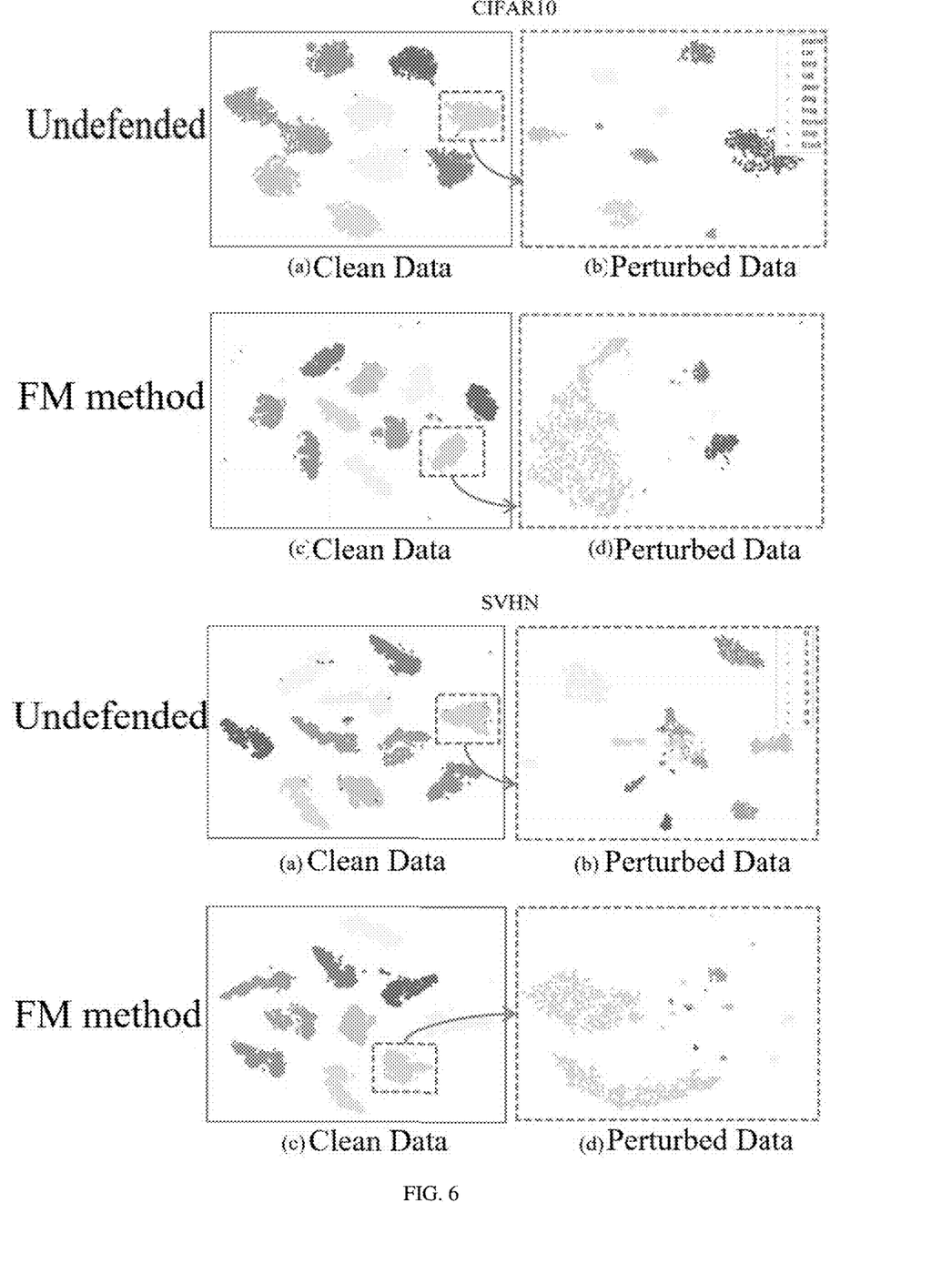
FIG. 6 is a comparison diagram between feature distribution of ResNet-V2(18) used as a backbone network on CIFAR10 and SVHN test data without defense and with a method of the present disclosure for defense.

In addition to above quantitative evaluation, a T-SNE tool can be adopted for qualitative analysis to visualize feature distribution of the model of the present disclosure and the undefended model. FIG. 6 shows feature distribution of ResNet-V2(18) used as a backbone network on CIFAR10 and SVHN test data. Distribution results of the undefended model ResNet-V2(18) and ResNet-V2(18) with the feature matching module respectively corresponding to CIFAR10 test data and SVHN test data are shown in FIGS. 6, and 500 images are selected from each category of test data to form a result for the clean data, and all of the perturbed data is from a category selected in a dotted box shown in FIG. 6. The perturbed data are generated by using the PGD attacks and the attack strength is set to be $\varepsilon=8/255$. On the one hand, it can be found from CIFAR10 distribution that the FM method makes features closer for the clean data over the undefended model. Effectiveness of the loss function according to this disclosure is proved, because with the loss function, all images of a same category are forced to approach their label coding features.

It can be seen from the first row that the PGD (with $\varepsilon=8/255$) attack disperses the features extracted from the box-selected category, and the perturbed data is completely identified into the other nine categories, which is consistent with the results of the undefended model in Table 1. In contrast, the feature distribution of the perturbed data generated by attacking the model of the present disclosure is relatively concentrated, and most of them are still identified into correct categories. In other words, the defense proposed by the present disclosure is strong enough that it is difficult to generate adversarial examples to fool the model with the feature matching module.

A defense method based on gradient obfuscation is unreliable, and the gradient obfuscation is considered to be unable to correctly obtain a true gradient from the defense model. It is shown from two perspectives that the strong robustness provided by the method of the present disclosure does not depend on gradient confusion: 1) In the above, it is proved that a fastest way to complete the attack in the model of the present disclosure can be successfully found for gradient-based attacks. In other words, a correct gradient of the model of the present disclosure can be successfully found for gradient-based attacks. 2) The FM method proposed by the present disclosure does not have following five phenomena, which, according to the related art, may occur in the defense strategy based on gradient confusion. In the following, relevant phenomena and rebuttal evidence are given to prove that these phenomena do not exist in the method of the present disclosure.

Phenomena 1: One-step attack provides better performance than iterative attacks.

Refutation: from the data in Table 2, robust accuracy of the network trained with the FGSM attack and with the FM module is higher than that with the PGD attack. In other words, the iterative attack PGD performs better than the one-step attack FGSM.

Phenomena 2: a black-box attack performs better than a white-box attack.

Refutation: from the transferable attack results in Table 6, the success rate in attacking the model B under the black-box attack is 13.76%, and is 19.73% under the white-box PGD attack. Therefore, in the model according to this disclosure, the white-box attack provides better performance than the black-box attack.

Phenomena 3: a success rate of 100% cannot be reached for unbounded attacks.

Figure 7:
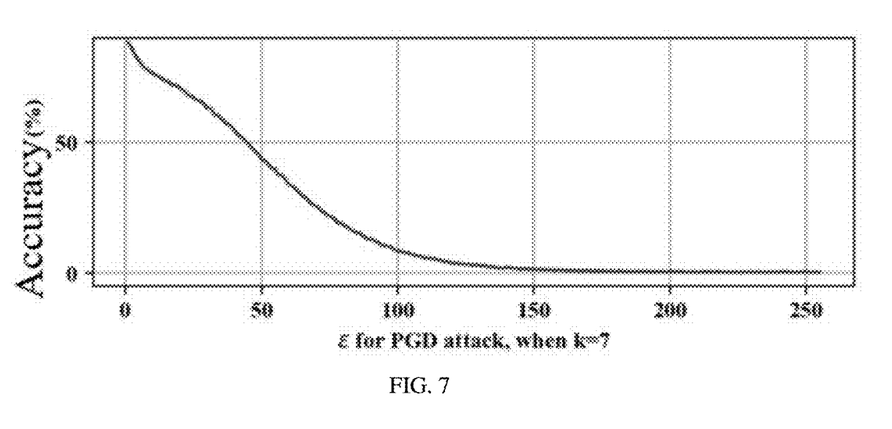
FIG. 7 shows a robustness trend of ResNet-V2(18) based on feature matching when it is attacked by PGD algorithm with different attack strength.

Refutation: As shown in FIG. 7, the success rate of 100% can be reached when ResNet-V2(18) using FM method is attacked again by increasing the attack strength of the PGD algorithm.

Phenomena 4: adversarial examples are found by random sampling.

Refutation: this phenomenon means that if adversarial examples cannot be found with a gradient-based attack method, there will be no adversarial example that can be found even if randomly sampling is made for $10^5$ times within a $\varepsilon$ ball of original samples. Therefore, 1000 test images are randomly selected from CIFAR10 test data. These test images were correctly classified by the model, but could not be successfully attacked by the PGD algorithm (with $\varepsilon=8/255$). Then, random noise sampling is made for $10^5$ times in a $\varepsilon$ ball of each of the test images, and classification accuracy for $10^8$ resulting perturbed images in the model is 100%.

Phenomenon 5: the success rate cannot be increased by increasing a distortion bound.

Refutation: As shown in FIG. 4 and FIG. 5, attack success rate can be increased by increasing the attack strength.

Figure 8:
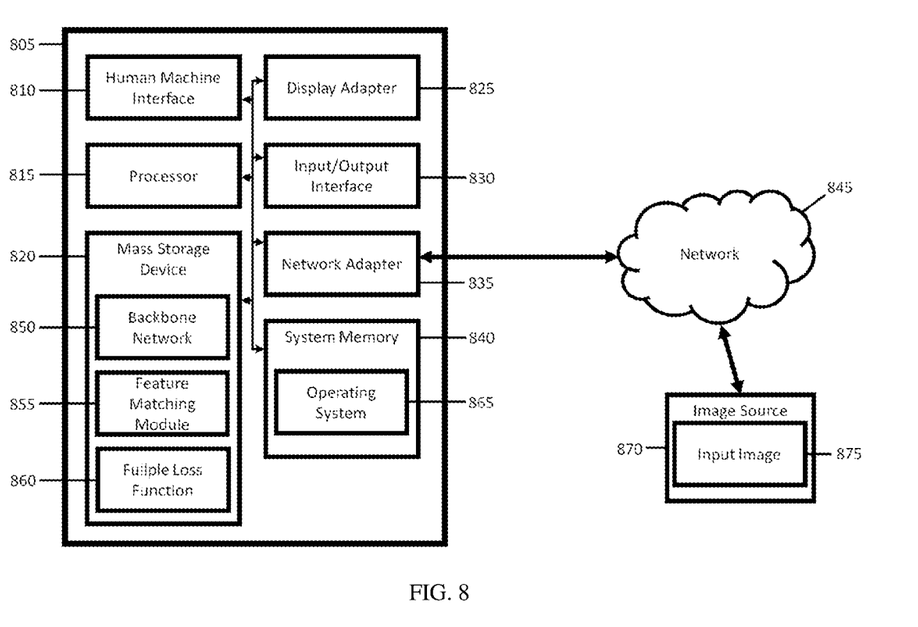
FIG. 8 is a block diagram illustrating an exemplary computing system in which the present system and method can operate provided by an embodiment of the present disclosure.

Referring to FIG. 8, the methods and systems of the present disclosure may be implemented on one or more computers, such as computer 805. The methods and systems disclosed may utilize one or more computers to perform one or more functions in one or more locations. The processing of the disclosed methods and systems may also be performed by software components. The disclosed systems and methods may be described in the general context of computer-executable instructions such as program modules, being executed by one or more computers or devices. For example, the software components include for example, without limitation, backbone network 850, feature matching module 855, and fullple loss function 860. Backbone network 850 is configured for extracting one or more features from one or more input images. Feature matching module 855 is configured to train various models and observe their robustness against different attack methods. Fullple loss function 860 is configured for training backbone network 850. These program modules may be stored on mass storage device 820 of one or more computers devices, and may be executed by one or more processors, such as processor 815. Each of the operating modules may comprise elements of programming and data management software.

The components of the one or more computers may comprise, but are not limited to, one or more processors or processing units, such as processor 815, system memory 840, mass storage device 820, Input/Output Interface 830, display adapter 825, network adaptor 835, and a system bus that couples various system components. The one or more computers and image source 870 may be implemented over a wired or wireless network connection at physically separate locations, implementing a fully distributed system. Additionally, image source 870 may include the one or more computers such that image source 870 and the one or more computers may be implemented in a same physical location. By way of example, without limitation, the one or more computers may be a personal computer, a portable computer, a smart device, a network computer, a peer device, or other common network node, and so on. Logical connections between one or more computers and image source 870 may be made via network 845, such as a local area network (LAN) and/or a general wide area network (WAN).

Image source 870 may be configured for capturing input image 875 and communicating input image 875 to computer 805 for image classification. Input image 870 may be any type of image known in the art. For example, without limitation and as shown in FIG. 1, input image may be an image of a plane, car, bird, truck, etc., and may or may not have a label corresponding to the plane, car, bird, truck, etc. Input image 875 may be captured directly by image source 870 may be image capturing hardware such as, without limitation, a camera, scanner, etc. Alternatively, image source 870 may be configured to digitally download or create an input image.

What is claimed is:

1. A training method for a robust neural network based on feature matching, executed by a processor, comprising:

step A, initializing a first stage model, in which the first stage model comprises a backbone network, a feature matching module and a fullple loss function, the feature matching module is configured to replace a fully connected layer;

an input image X is captured via a camera and input into the first stage model through a network via a network adaptor and stored in a memory;

a backbone network and a global average pool are used to extract a feature Fx of the input image X;

the feature matching module comprises three processes: embedding of a tag, querying of positive features and negative features, and calculation of a distance between features;

the fullple loss function is expressed as $$\mathcal{L}(x, fw) = \max\{d(F_x, F_P) - \alpha, 0\} + \max\{\beta - d(F_x, F_N), 0\},$$

label coding features are classified into positive features $F_P$ and negative features $F_N$, which are obtained through a query process; for a given image x and its label y, $F_P$ indicates a one-dimensional vector at a y-th row in an embedding matrix, and $F_N$ indicates remaining vectors; the fullple loss function is divided into two parts, a first part refers to positive sample loss, and if an Euclidean distance between the image feature Fx and the positive feature $F_P$ is less than a threshold $\alpha$, loss of this part is zero, in which $\alpha$ is set to allow an output of the model to vary in a specified range in training; a second part refers to negative sample loss, which is configured to prevent the model from learning similar features of different categories of images, and if a distance between the image feature Fx and all of the negative features $F_N$ exceeds a threshold $\beta$, loss of this part is zero;

$$\alpha = \sqrt{\operatorname{len}(F_x) \cdot 2 \cdot 10^{-9}}$$

$$\beta = \sqrt{\operatorname{len}(F_x) \cdot 7 \cdot 10^{-4}},$$

len(Fx) indicates a length of an image feature extracted by the backbone network;

Euclidean distances between feature vectors Fi{i=0, 1, , n−1} of respective categories and the feature vector Fx of the image are calculated to form matching scores of the network, which represents difference between feature vector of the image and feature vectors of n categories $$fw(x) = [d(F_x, F_0), d(F_x, F_1), \ldots, d(F_x, F_{n-1})];$$

an index with a smallest matching score is selected as a classification result $$\mathrm{pred} = \arg\min\{f\psi(x)\};$$

step B, training the first stage model by using original training data to obtain a second stage model;

step C, attacking the second stage model so as to generate PGD adversarial samples of the original training data, and training the second stage model again with the generated adversarial samples and the original training data; and step D, adjusting training parameters, training the second stage model again, and saving parameters for which the model has highest accuracy on an original test set;

thus accurately performing image classification on the input image X with enhanced robustness against adversarial attacks.

2. The training method for the robust neural network based on feature matching according to claim 1, wherein in the step B, a learning rate in training is lr=0.001, and a training cycle is 20 epochs.

3. The training method for the robust neural network based on feature matching according to claim 1, wherein in the step C, perturbation strength of the PGD adversarial samples is 8/255, and a number of attack steps is 7.

4. The training method for the robust neural network based on feature matching according to claim 3, wherein in calculating the loss, losses of the adversarial samples and the original training data are weighted and averaged, with weights both being 0.5.

5. The training method for the robust neural network based on feature matching according to claim 1, wherein in step D, firstly the step C is iterated for 95 epochs, and then the step C is iterated for 100 epochs after the learning rate lr is adjusted to be 0.0001.

* * * * *